United States Patent
Kennedy et al.

[11] Patent Number: 5,815,350
[45] Date of Patent: Sep. 29, 1998

[54] HEAD DISK ASSEMBLY WITH ACTUATOR LATCH VIBRATION DAMPER

[75] Inventors: Michael John Kennedy, Los Gatos; Marty McCaslin, Pleasanton; Keith Mayberry, Mountain View, all of Calif.

[73] Assignee: Western Digital Corporation, Irvine, Calif.

[21] Appl. No.: 831,988

[22] Filed: Apr. 1, 1997

[51] Int. Cl.⁶ ............................... G11B 5/54; G11B 21/22
[52] U.S. Cl. ............................................................. 360/105
[58] Field of Search .................................... 360/105, 106, 360/97.01, 75

[56] References Cited

U.S. PATENT DOCUMENTS

| | | | |
|---|---|---|---|
| 4,562,500 | 12/1985 | Bygdnes | 360/105 |
| 4,947,274 | 8/1990 | Casey et al. | 360/105 |
| 5,095,393 | 3/1992 | Janz | 360/77.05 |
| 5,095,395 | 3/1992 | Wakatsuki | 360/105 |
| 5,343,346 | 8/1994 | Bleeke | 360/105 |
| 5,365,389 | 11/1994 | Jabbari et al. | 360/105 |
| 5,369,538 | 11/1994 | Moe et al. | 360/105 |
| 5,477,403 | 12/1995 | Strickler | 360/105 |
| 5,566,375 | 10/1996 | Isomura | 360/105 |
| 5,570,250 | 10/1996 | Casey | 360/106 |
| 5,654,852 | 8/1997 | Kitano et al. | 360/105 |

FOREIGN PATENT DOCUMENTS

| | | | |
|---|---|---|---|
| 62-287475 | 12/1987 | Japan | 360/105 BA |
| 4-149821 | 5/1992 | Japan | 360/105 |

Primary Examiner—Stuart S. Levy
Assistant Examiner—Kevin M. Watkins
Attorney, Agent, or Firm—Leo J. Young; W. Chris Kim

[57] ABSTRACT

A head disk assembly (HDA) for a hard disk drive includes vibration damping structure. The HDA also includes an enclosure, a disk, a pivot bearing cartridge, and a head stack assembly (HSA). The enclosure includes a base that preferably includes integral side walls. The disk has a recording surface that has an annular landing zone. The pivot bearing cartridge includes a shaft fixed to the enclosure, and the head stack assembly is connected to the pivot bearing cartridge for rotation relative to the shaft. The HSA includes a head supported to be moved radially relative to the recording surface and to be brought to rest at a position in the landing zone. The base has a plurality of interior-facing surfaces including a major interior-facing surface parallel to the recording surface. Significantly, one of the interior-facing surfaces of the base serves as a bearing surface against which the vibration damping structure is compressed. The HDA also includes a unitary crash stop member and magnetic engaging structure. The unitary crash stop member has a mounting portion, a latch-supporting cantilevered arm extending parallel to the major interior surface, and a latch-supporting post supported by the latch-supporting cantilevered arm. The magnetic engaging structure is supported by the latch-supporting post, and includes an engaging end oriented to abut a plane perpendicular to the major interior-facing surface. The HSA also includes a tang having a tang surface for abutting the engaging end to provide an inner crash stop and latch. The HDA also includes structure for affixing the unitary crash stop member to the base such that a portion of the unitary crash stop member abuts the vibration damping means and compresses it against the bearing surface.

6 Claims, 8 Drawing Sheets

FIG. 11

HEAD DISK ASSEMBLY WITH ACTUATOR LATCH VIBRATION DAMPER

BACKGROUND OF THE INVENTION

1. Field of the Invention

This invention relates to hard disk drives. More specifically, this invention relates to a head disk assembly for a disk drive in which there is provided an actuator latch vibration damper.

2. Description of the Related Art

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exits substantial competitive pressure to develop mass-market hard disk drives that have even higher capacities and that provide rapid access to data. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main subassemblies of a hard disk drive are a head disk assembly ("HDA") and a printed circuit board assembly.

The HDA includes: an enclosure including a base and a cover; at least one disk having at least one recording surface; a spindle motor for causing each disk to rotate; and an actuator arrangement. The printed circuit board assembly includes circuitry for processing signals and controlling operations of the drive.

In a contemporary mass-marketed drive, the actuator arrangement is a type often referred to as a rotary voice coil motor (VCM) actuator. The rotary VCM actuator in a head disk assembly typically includes a permanent magnet arrangement forming part of the voice coil motor, a head stack assembly (HSA), and a pivot bearing cartridge that includes a shaft attached to the base to define an axis of rotation for the rotary actuator. The HSA includes a separate head gimbal assembly (HGA) for each recording surface. The HGA includes transducing structure for writing to and reading from a recording surface of a disk. The transducing structure can be a single inductive transducer such as a thin film head, or a structure including an magneto resistive (MR) element for reading and an inductive element for writing. The transducing structure is suitably contained in a structure referred to interchangeably as a slider or a head. The HSA further includes a coil-carrying wing or cantilevered portion, the coil of which forms another part of the voice coil motor. The HSA further includes a swing-type structure, and a flex circuit assembly. The swing-type structure has a ring-shaped portion (i.e., a bore extends through it) for surrounding the pivot bearing cartridge, and further includes a plurality of arms cantilevered from the ring-shaped portion.

Each HGA includes a load beam and a slider. Each load beam has a supported end and a free end, with the supported end being supported by one of the arms. Each head is supported by one of the load beams at its free end and in use is positioned adjacent a disk recording surface.

For each head and recording surface, the relative position of the head and the recording surface involves a vertical distance (such as a flying height or contact) and a radial distance (where the head is relative to the center of the recording surface).

As for vertical distance, while the disks are spinning at normal speed of operation, each head flies adjacent to a recording surface of a disk on a cushion of flowing air. When power is removed and the disks discontinue rotating, the heads "land" on the adjacent surfaces.

As for radial positioning, the HSA forms part of a servo system for controlling the radial position of the heads. The operations of the servo system include track seek operations and track following operations. During a track seek operation, the voice coil motor generates relatively high torque to cause the HSA to rotate about the pivot bearing axis and thereby move the heads radially relative to the disk recording surfaces. During track following operations, the voice coil motor generates relatively low torque in an amount and direction to maintain the heads at substantially the same radial position relative to tracks on the recording surfaces throughout the track following operation.

While the power is off, it is desirable to "park" each head in a position on an annular region of the recording surface referred to as a "landing zone." The landing zone is typically located within another annular zone (i.e., the zone used for recording and reading signals which may be further subdivided into zone bands). To park the heads, the HSA is held to prevent it from rotating even if the drive is dropped, struck or otherwise mishandled. To hold the HSA (and thus the heads) in place while the drive is not in use, the HDA typically includes an arrangement that performs a latching function. A related function is a crash stop function. That is, it is desirable to provide an arrangement for limiting the angular motion of the HSA to a range having an inner limit and an outer limit.

Certain prior art arrangements for performing the crash stop and latching functions are taught in U.S. Pat. No. 4,947,274 (the '274 patent) and U.S. Pat. No. 5,343,346 (the '346 patent). The arrangement taught in the 274 patent involves independent structures for performing the crash stop function for the inner limit and the outer limit. Each of these independent structures involves an assembly of a frame and a bumper pad. One of these independent structures also includes additional components for participating in the latching function. The time required to preassemble these structures constitutes a cost disadvantage when considered in light of the competitive market for disk drives. The fact that the structures are independent of each other can also be a cost disadvantage.

The arrangement taught in the '346 patent involves a dual-post unitary crash stop member that is simpler to install than the independent structures described above. The dual-post unitary structure has a configuration to define a mounting portion, a pair of cantilevered, oppositely-projecting arms, and a pair of posts each supported at a far end of a respective one of the arms. The arrangement also includes a generally cylindrical magnet supported by one of the posts in an orientation such that its axis is parallel to the cantilevered arms. The arrangement also includes a ferromagnetic strike plate which is cantilevered to project from a bumper portion of a HSA in a direction such that, in the HDA, the strike plate is between the pair of posts of the dual-post unitary crash stop member.

Whereas the strike plate shown in the '346 patent is cantilevered from a bumper, in certain prior art disk drives, a structure referred to herein as a tang is cantilevered to project from an overmolded coil portion of the HSA.

The tang is generally paddle shaped with first and second oppositely facing surfaces. One of these oppositely facing surfaces abuts one of the posts of the dual-post unitary crash stop member to perform the outer crash stop function. The other oppositely-facing surface abuts the end of the cylindrical magnet to perform the inner crash stop and latching functions.

The arrangement described immediately above has a cost advantage compared with the arrangement described in the '274 patent. However, it has certain performance drawbacks. While the HSA is being rotated to place the head in the landing zone, the angular velocity can be relatively high. As a result, the tang frequently strikes the end of the magnet at a high rate of speed. This high speed contact introduces vibrations into various parts of the HSA including each head.

Figure 1A:
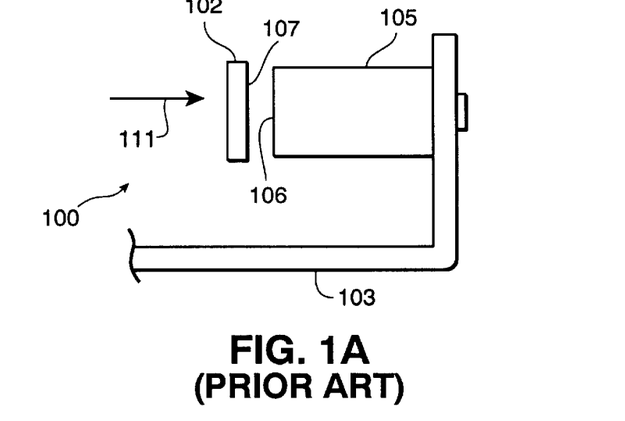
FIG. 1A is schematic cutaway side view of a portion of a head disk assembly showing components of an actuator latch arrangement in a condition of operation before impact between a tang surface and an end of a magnet occurs.
Figure 1B:
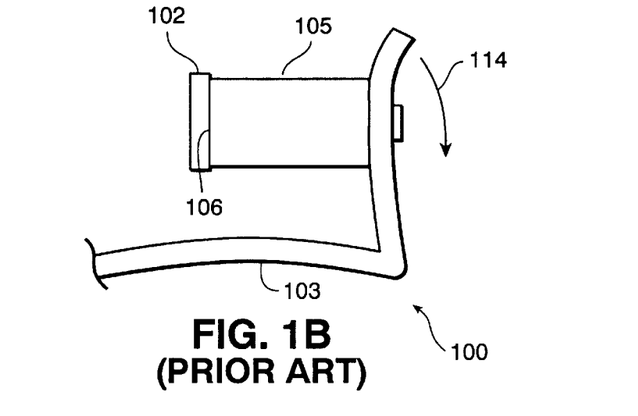
FIG. 1B is a schematic side view of the components of Prior Art FIG. 1A during impact between the tang surface and the end of the magnet.
Figure 1C:
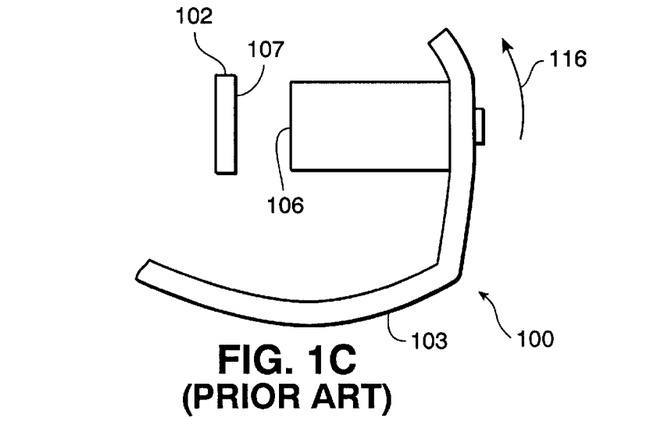
FIG. 1C is a schematic side view of the components of Prior Art FIG. 1A after impact between the tang surface and the end of the magnet.

With reference to Prior Art FIGS. 1A, 1B, 1C, 2A, and 2B, the performance drawback will now be described in more detail. In FIGS. 1A–1C, a portion of an actuator latch arrangement that performs crash stop and latching functions includes a subassembly 100 and a tang 102. Subassembly 100 includes a unitary crash stop member 103 (only a portion of which is shown in these Figures) and a generally cylindrical magnet 105 having an end 106. Tang 102 includes a surface 107 that faces end 106.

As indicated by an arrow 111 in FIG. 1A, surface 107 travels toward end 106 while the HSA is being moved toward the park position. As indicated by an arrow 114 in FIG. 1B, when surface 107 collides with end 106 at a sufficiently high rate of speed, subassembly 100 deflects (the extent of such deflection is emphasized in FIG. 1B). As indicated by an arrow 116 in FIG. 1C, subassembly 100 resiliently responds and causes surface 107 to bounce away from end 106. Thus, even though tang 102 would ideally be magnetically held in place, the impact between surface 107 and end 106 can cause the de-latching shown in Prior Art FIG. 1C. This contacting and de-latching process causes vibrations to propagate from tang 102, through other parts of the HSA to the sliders containing the heads.

The propagation of vibrations to the heads can cause undesirable motions of the head relative to the recording surface of the disk. These vibrations cause the head to oscillate horizontally across the landing zone towards and away from center of the disk. These vibrations also cause a striking or slapping motion commonly referred to as dynamic head slap (DHS). Problems attributable to such horizontal motions and DHS are illustrated in Prior Art FIGS. 2A–2B.

Figure 2A:
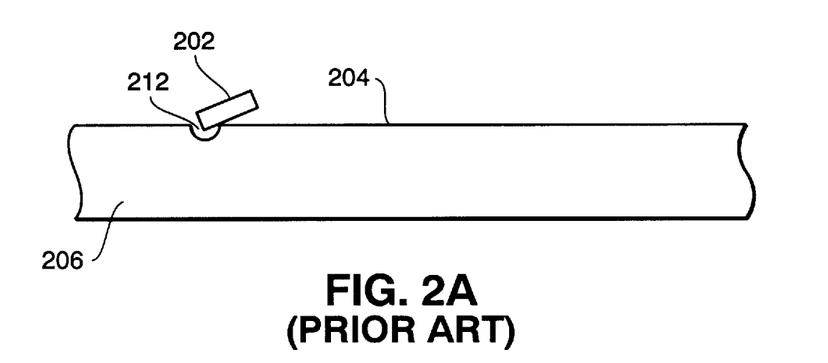
FIG. 2A is a schematic side view of a portion of the head disk assembly of Prior Art FIG. 1A showing a head and a disk in a condition of operation after impact between the tang surface and the end of the magnet.
Figure 2B:
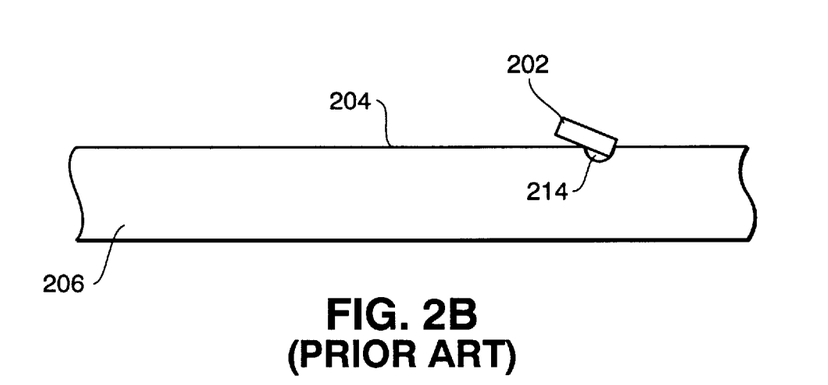
FIG. 2B is a schematic side view of a portion of the head disk assembly of Prior Art FIG. 1A showing a head and a disk in another condition of operation after impact between the tang surface and the end of the magnet.

With reference to Prior Art FIGS. 2A and 2B, a slider 202 is supported by a load beam (not shown) above a landing zone 204 defined on a recording surface of a disk 206. Slider 202 has two degrees of freedom relative to the load beam so that, among other things, slider 202 is free to roll. In Prior Art FIG. 2A, slider 202 is shown in a condition of operation resulting from vibrations propagating through the load beam after the impact depicted in FIG. 1B has occurred. In the condition of operation depicted in FIG. 2A, slider 202 has rolled and a side edge of slider 202 has crashed into an area in landing zone 204. This crash has caused an indentation or divot 212.

In Prior Art FIG. 2B, slider 202 is shown in another condition of operation resulting from such vibrations propagating through the load beam. In FIG. 2B, slider 202 has rolled and a side edge of slider 202 has crashed into another area in landing zone 204. This crash has caused an indentation or divot 214.

The above-described crashes can cause damage to the disk and can cause damage to the slider. Furthermore, debris dislodged from such crashes can cause problems in the operation of the disk drive.

Such deleterious contact between the head and the surface of the disk can occur numerous times. By measuring the location of each indentation or divot and knowing the rotational speed of the disk, the frequency of the slider's horizontal oscillation towards and away from the center of the disk can be determined. Debris created by such divots chipped from the surface of disk 206 can migrate to the data zone and cause contamination of the HDA. Also, slider debris resulting from the impact can also contaminate the HDA. In addition, the indentation formed in the landing zone can affect the flying height of slider 202. That is, when slider 202 is flying near landing zone 204, a portion of slider 202 may actually pass over the indentations or divots 212 formed in landing zone 204. These indentations or divots 212 can dramatically affect the flying height of slider 202.

Figure 3:
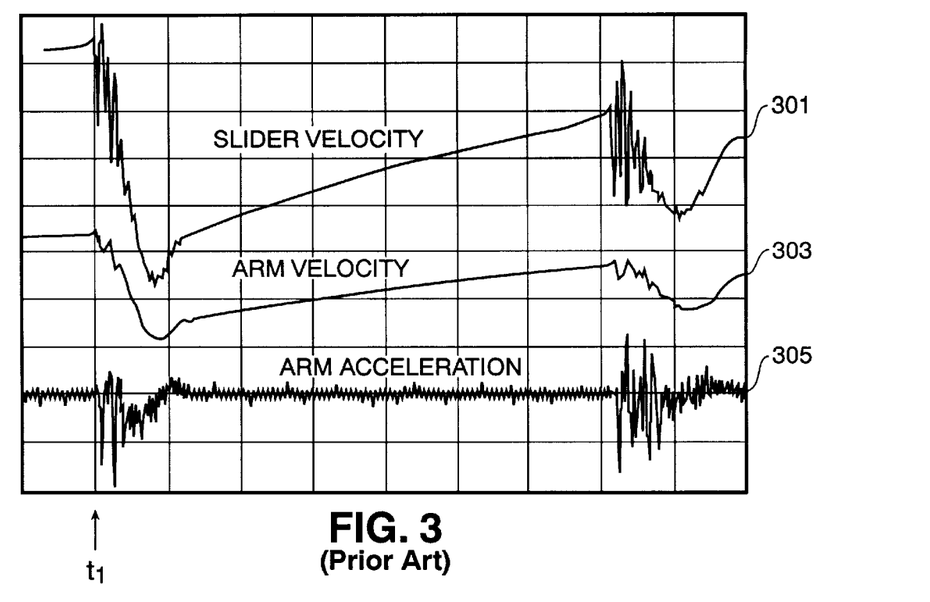
FIG. 3 is a graph showing slider velocity, arm velocity, and arm acceleration, each as a function of time, for conditions of operation in a prior art head disk assembly after impact between a tang surface and an end of a magnet of a magnetic latch.

With reference to the graph of Prior Art FIG. 3, there will now be described data collected from experiments conducted with a prior art head disk assembly. These experiments involved use of conventional test equipment including a laser vibrometer, a signal analyzer, and a stable platform. With this test equipment, laser beams were directed at various points of a head stack assembly and other test equipment recorded slider velocity, arm velocity, and arm acceleration throughout a period of time. FIG. 3 covers a time period of approximately 22 milliseconds, including a relatively short interval before a tang surface corresponding to tang surface 107 impacts an end corresponding to end 106, and a relatively longer time interval after impact. In FIG. 3, curve 301 depicts the velocity of the slider, curve 303 depicts the velocity of the arm supporting the slider, and curve 305 depicts the acceleration of the arm. A typical value for slider velocity at the point immediately before the impact is 35 inches per second.

At time $t_1$, tang surface 107 impacts end 106. At that time, the arm acceleration is essentially 0 inches per second per second. Immediately after impact, a temporary latch occurs and the slider velocity as a function of time has an oscillatory component at a relatively high frequency as indicated by the up and down swings in curve 301 during the interval in which the average velocity is swinging down. During an intermediate time interval following the time interval in which temporary latch occurs, delatching (bounce) occurs. After reaching a local minimum velocity, the slider velocity ramps up again until a second impact between tang surface 107 and end 106 occurs. This second impact also causes the slider velocity to exhibit a relatively high frequency oscillatory component.

Thus, a need exists for an HDA with a low cost arrangement that provides for securely holding the HSA in a fixed position with the head in the landing zone and avoids the performance drawbacks of dynamic head slap and resulting damage either to the disk or the head or both.

SUMMARY OF THE INVENTION

This invention can be regarded as a head disk assembly for a hard disk drive. Significantly, the head disk assembly includes vibration damping means. The head disk assembly also includes an enclosure, a disk, a pivot bearing cartridge, and a head stack assembly. The enclosure includes a base that preferably includes integral side walls. The disk has a recording surface that has an annular landing zone. The pivot bearing cartridge includes a shaft fixed to the enclosure, and the head stack assembly is connected to the pivot bearing cartridge for rotation relative to the shaft. The head stack assembly includes a head supported to be moved radially relative to the recording surface and to be brought to rest at a position in the landing zone. The base has a plurality of interior-facing surfaces including a major interior-facing surface parallel to the recording surface. Significantly, one of the interior-facing surfaces of the base serves as a bearing surface against which the vibration damping means is compressed. The head disk assembly also includes a unitary crash stop member and magnetic engaging means. The unitary crash stop member has a mounting portion, a latch-supporting cantilevered arm extending parallel to the major interior surface, and a latch-supporting post supported by the latch-supporting cantilevered arm. The magnetic engaging means is supported by the latch-supporting post, and includes an engaging end oriented to abut a plane perpendicular to the major interior-facing surface. The head stack assembly also includes a tang having a tang surface for abutting the engaging end to provide an inner crash stop and latch. The head disk assembly also includes means for affixing the unitary crash stop member to the base such that a portion of the unitary crash stop member abuts the vibration damping means and compresses it against the bearing surface.

In one embodiment, the base includes a generally cylindrical recess that opens away from the major interior facing surface. In this embodiment, the vibration damping means has a generally cylindrically-shaped configuration with a first portion being disposed in the recess and a second portion extending outside the recess. In this embodiment, the latch-supporting cantilevered arm abuts the vibration damping means with nominal precompression.

In another embodiment, a side wall of the base defines the bearing surface which is elongated and extends in a direction perpendicular to the major interior-facing surface. In this embodiment, the vibration damping means is wedged between the latch-supporting post and an interior-facing bearing surface on a side wall of the base.

Preferably, the vibration damping means comprises a compressible member formed of material selected from the group consisting of microcellular polyurethane, ethylene propylene diene rubber (EPDM), butyl rubber, and urethane elastomers.

BRIEF DESCRIPTION OF THE DRAWINGS

Prior Art

Prior Art

Prior Art

Prior Art

Prior Art

Prior Art

DETAILED DESCRIPTION OF THE INVENTION

Figure 4:
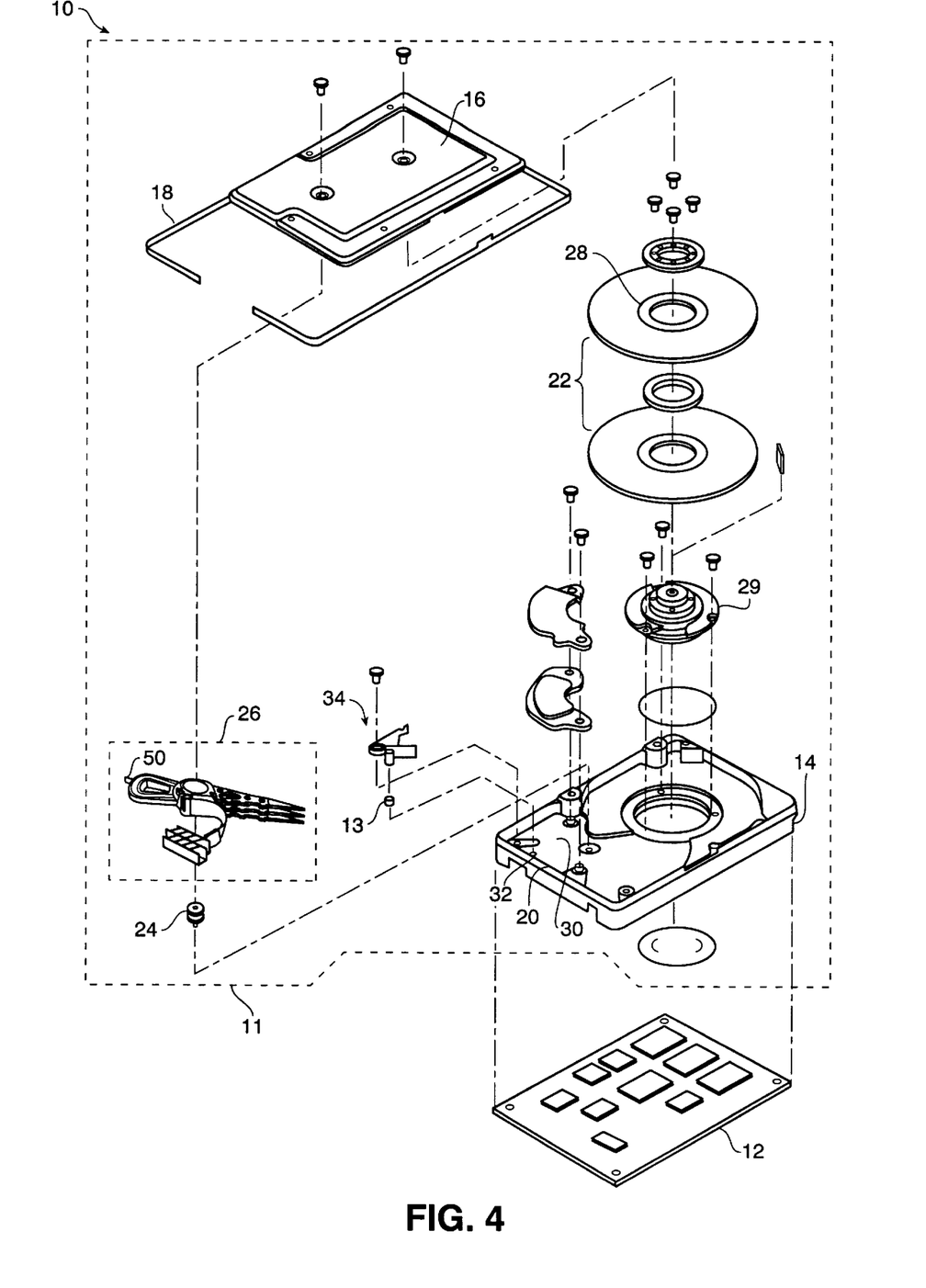
FIG. 4 is an exploded view of a disk drive including a preferred embodiment of this invention.

A preferred embodiment of this invention is incorporated within a disk drive such as disk drive 10 shown in FIG. 4. Disk drive 10 includes a head disk assembly (HDA) 11 and a printed circuit board assembly (PCBA) 12.

Significantly, HDA 11 includes vibration damping means preferably implemented by a solid elastic cylinder 13. HDA 11 also includes an enclosure including a base 14, a cover 16, and a tape seal 18. Preferably, base 14 includes integral side walls including a side wall 20. The enclosure provides a relatively contaminant-free interior for HDA 11.

Within the enclosure, HDA 11 includes a disk 22, a pivot bearing cartridge 24, and a head stack assembly 26. In the particular embodiment depicted in FIG. 4, HDA 11 includes two disks, each having a pair of recording surfaces to provide a total of four recording surfaces that are parallel to each other in a vertical stack. Each recording surface has a landing zone 28. HDA 11 also includes a spindle motor 29 for causing each disk to spin, preferably at a constant angular velocity.

In the illustrated embodiment, HSA 26 includes four sliders or heads each of which includes a magnetic transducing structure for writing to and reading from a respective one of the recording surfaces. The transducing structure can be a single inductive transducer or a structure including an magneto resistive (MR) element for reading and an inductive element for writing. Pivot bearing cartridge 24 includes a shaft, a generally cylindrical outer shell, and an internal bearing arrangement for the outer shell to rotate about the shaft. The shaft is fixed to the enclosure to define the axis of rotation, and HSA 26 is connected to the outer shell so that it can rotate about the shaft.

Base 14 has a plurality of interior-facing surfaces including a major interior-facing surface 30 parallel to the recording surfaces of disks 22.

HSA 26 provides for moving each of its heads radially relative to the adjacent recording surface and to be brought to rest at a position in landing zone 28. Significantly, one of the interior-facing surfaces of base 14 serves as a bearing surface against which the vibration damping means is compressed. In the preferred embodiment depicted in FIG. 4, interior-facing surface 30 includes a generally cylindrical recess 32 that opens to receive a portion of solid elastic cylinder 13. HDA 11 also includes a latch subassembly 34.

Figure 5:
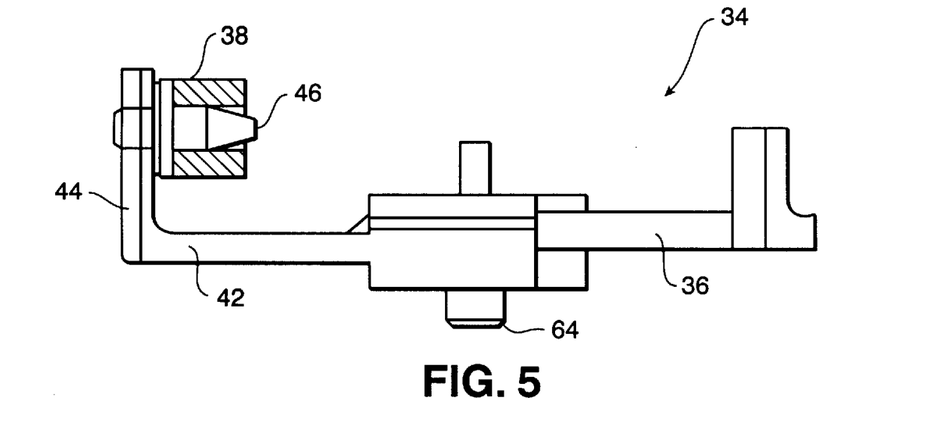
FIG. 5 is a side view of a crash-stop subassembly that is incorporated into the head disk assembly of FIG. 4, the crash-stop subassembly including a unitary dual-post crash stop member and a magnet.
Figure 6:
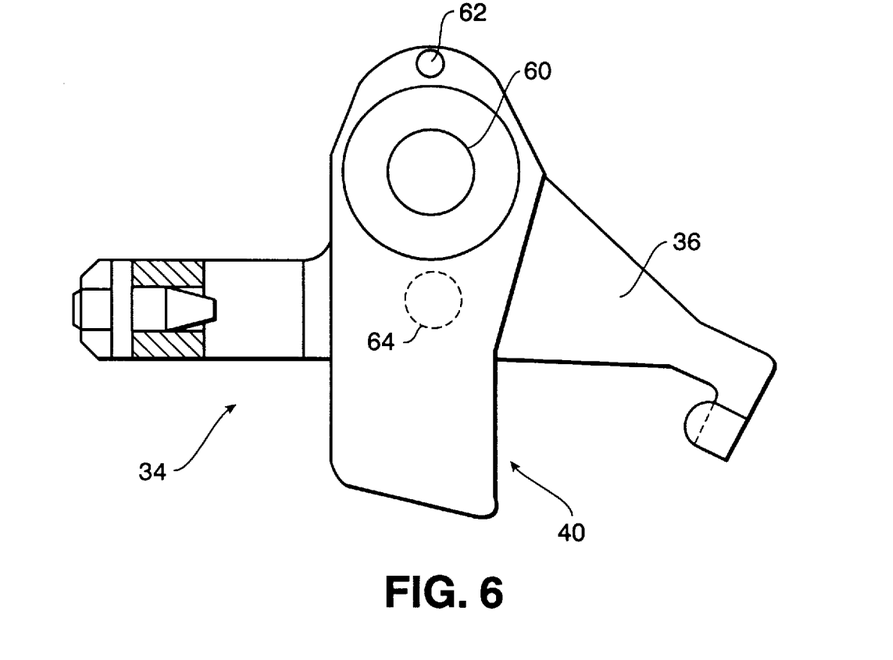
FIG. 6 is a top view of the crash-stop subassembly of FIG. 5.

With reference to FIGS. 5 and 6, latch subassembly 34 comprises a unitary dual-post crash stop member 36 and magnetic engaging means 38. Unitary dual-post crash stop member 36 preferably is made of polyethermide, a plastic sold under the trademark ULTEM 1000, and has a mounting portion 40, a latch-supporting cantilevered arm 42 that after installation within HDA 11 extends parallel to major interior surface 30 (FIG. 4), and a latch-supporting post 44 supported by latch-supporting cantilevered arm 42. Magnetic engaging means 38 is supported by latch-supporting post 44, and includes an engaging end 46 oriented so that after installation within HDA 11 it abuts a plane perpendicular to major interior-facing surface 30.

Figure 7:
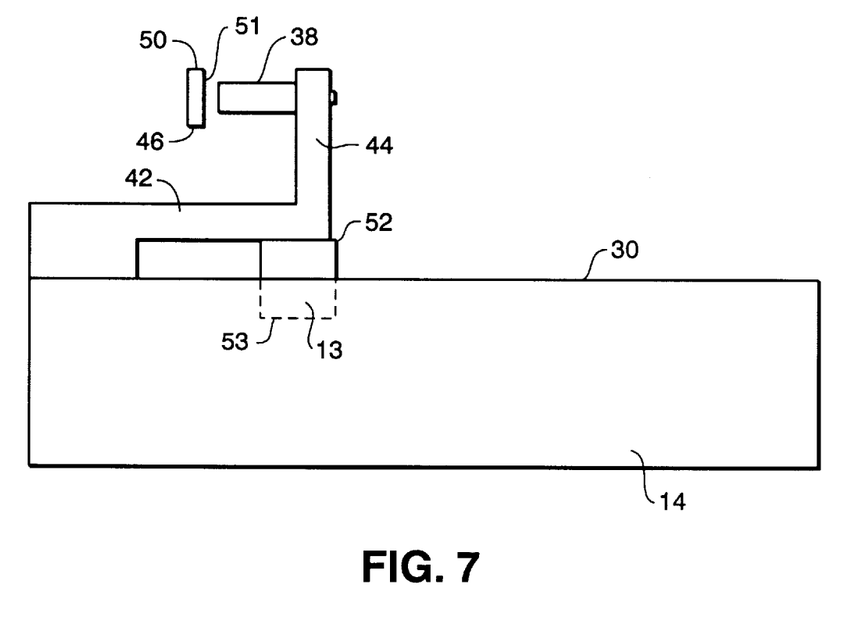
FIG. 7 is a side view of an arrangement defined in the head disk assembly of FIG. 4, the arrangement involving a portion of the crash stop member compressing a cylindrical vibration damping component.

With reference to FIG. 7, HSA 26 also includes a tang 50 having a tang surface 51 for abutting engaging end 46 to provide an inner crash stop and latch. HDA 11 also includes means for affixing unitary dual-post crash stop member 36 to base 14 such that a portion 52 of dual-post unitary crash stop member 36 abuts solid elastic cylinder 13 and compresses it against a bearing surface 53 defined at the bottom of recess 32.

With reference to FIGS. 5 and 6, mounting portion 40 has location features to ensure it is affixed to base 14 in proper orientation. Mounting portion 40 includes a countersunk screw hole 60 and a pair of location posts 62 and 64.

Embodiments of this invention reduce adverse effects resulting from vibrations originating from crashing into the latch and propagating to the heads. By reducing the vibrations which are imparted to the head, the large slider oscillations found in the prior art are reduced. Dampening of these oscillations prevents the slider from deleteriously striking the disk in a manner which forms indentations or divots associated with the prior art.

The type of material best suited for the vibration damping means is a function of the mechanical system. That is, the durometer or elasticity of the material must be selected according to, for example, the resonant frequency and mass of the head stack assembly, the average velocity at which the tang will strike the latching means, and the like. In one embodiment, the vibration damping means is formed of microcellular polyurethane known under the trademark PORON available from the Rogers Corporation of East Woodstock, Conn. In another embodiment, the vibration damping means is formed of ethylene propylene diene rubber commonly referred to as EPDM. Another suitable material for forming vibration damping means is butyl rubber available from Rayco Rubber Manufacturing Co. Pte. Ltd., of Tai Seng Industrial Estate, Singapore. Other suitable materials are various well known and widely available urethane elastomers.

Figure 8:
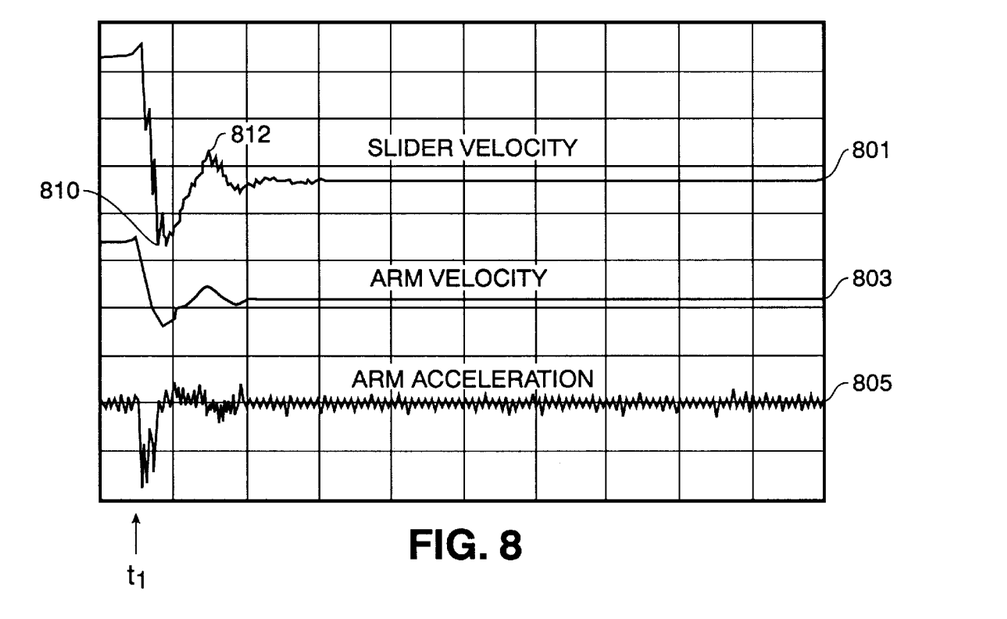
FIG. 8 is a graph showing slider velocity, arm velocity, and arm acceleration, each as a function of time, for conditions of operation in a head disk assembly embodying this invention, after impact between a tang surface and an end of a magnet of a magnetic latch.
Figure 9:
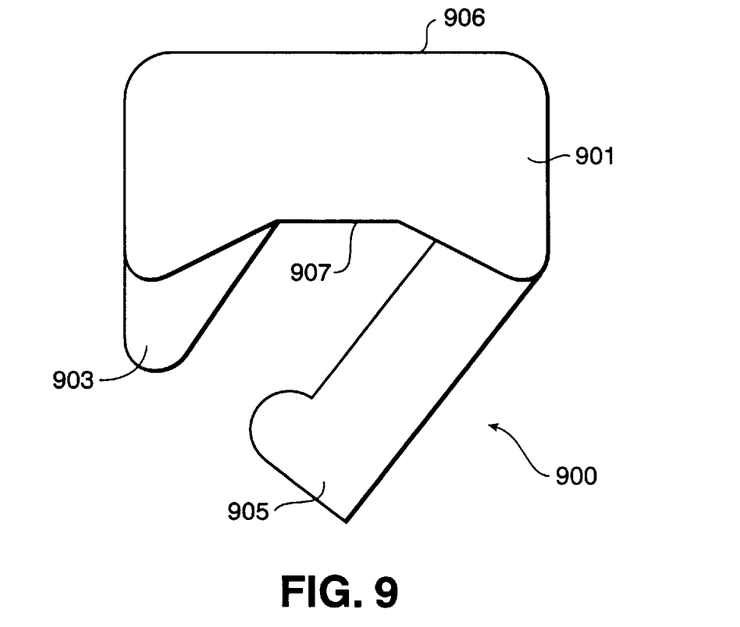
FIG. 9 is a side view of a vibration damping component that is incorporated into an alternative embodiment of a head disk assembly in accordance with this invention.
Figure 10:
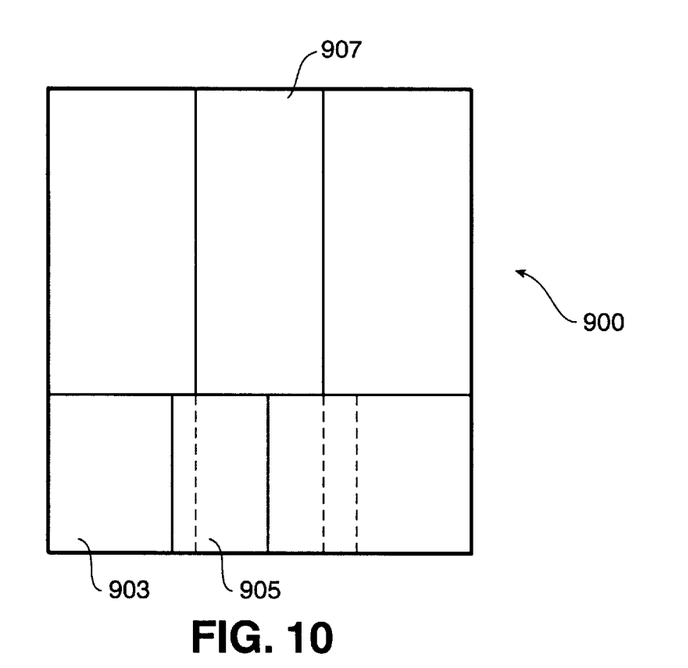
FIG. 10 is a top view of the vibration damping component of FIG. 9.

With reference to the graph of FIG. 8, there will now be described data collected from experiments conducted with a head disk assembly in accordance with the preferred embodiment as depicted in FIG. 4. These experiments involved use of the same conventional test equipment described above for the experiments on a prior art head disk assembly and shown in FIG. 3. FIG. 8 covers a time period of approximately 22 milliseconds, including a relatively short interval before tang surface impacted end 46, and a relatively longer time interval after impact. In FIG. 8, curve 801 depicts the velocity of the slider, curve 803 depicts the velocity of the arm supporting the slider, and curve 805 depicts the acceleration of the arm. The scale for the ordinate or "y" axis in FIG. 8 is the same as the corresponding scale for Prior Art FIG. 3.

At time $t_1$, tang surface impacts end 46. At that time, the arm acceleration is essentially 0 inches per second per second. Immediately after impact, latch occurs and the slider velocity as a function of time has an oscillatory component at a relatively high frequency as indicated by the up and down swings in curve 801 during the interval in which the average velocity is first swinging down to reach a first local minimum at 810, then swinging up to a local maximum at 812, then swinging to rest. Comparing curve 801 of FIG. 8 with curve 301 of FIG. 3 reveals a significant reduction in the extent of the high frequency oscillatory component in the case of the HDA embodying the invention. In addition, no delatching occurred in the example of operation involved in FIG. 8.

Figure 11:
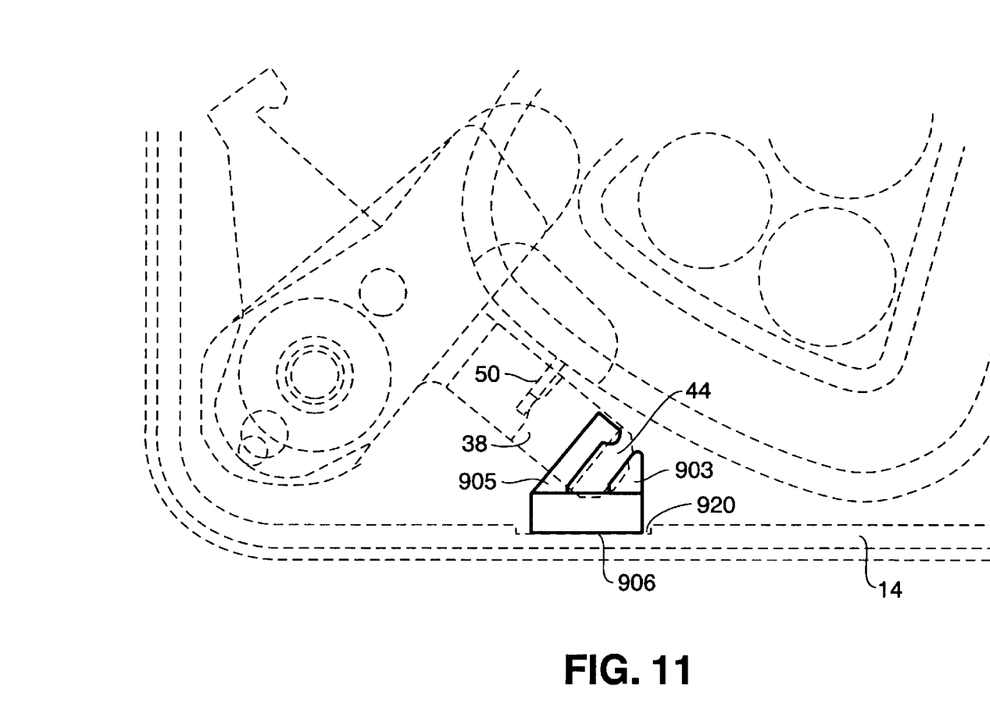
FIG. 11 is a top plan view of a portion of a head disk assembly incorporating the vibration damping component of FIGS. 9 and 10.
Figure 12:
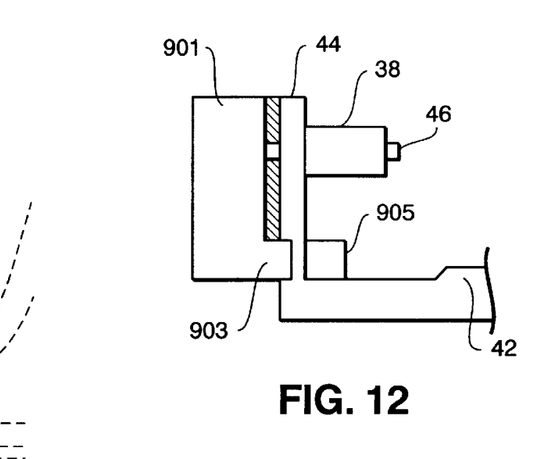
FIG. 12 is an elevation view of a portion of a subassembly including the unitary crash stop and the vibration damping component of FIGS. 9 and 10.

With reference to FIGS. 9, 10, 11, and 12, there will now be described an alternative embodiment involving a vibration damping component that is wedged between the latch post and a bearing surface on a side wall of the base. A vibration damping component generally indicated at 900 includes a slab 901 and a pair of feet 903 and 905. Slab 901 has a plurality of surfaces including a flat surface 906 and a surface 907 that is opposite from surface 906. Feet 903 and 905 project from surface 907. Feet 903 and 905 have sufficient clearance between them such that they define a collar portion for gripping latch post 44 as best shown in FIG. 12. As best shown in FIG. 11, flat surface 906 abuts an interior-facing surface 920 defined in a recess in a side wall of base 14.

We claim:

1. A head disk assembly for a hard disk drive, the head disk assembly comprising:

an enclosure having a base;

a disk having a recording surface;

a pivot bearing cartridge including a shaft fixed to the enclosure;

a head stack assembly connected to the pivot bearing cartridge for rotation relative to the shaft;

the recording surface including an annular landing zone;

the head stack assembly including a head supported to be moved radially relative to the recording surface and to be brought to rest at a position in the landing zone;

the base having a plurality of interior-facing surfaces including a major interior-facing surface parallel to the recording surface;

one of the interior-facing surfaces defining a bearing surface;

a unitary crash stop member having a mounting portion, a latch-supporting cantilevered arm extending parallel to the major interior surface, and a latch-supporting post supported by the latch-supporting cantilevered arm;

a vibration damping member located between the latch-supporting post and the bearing surface;

magnetic engaging means supported by the latch-supporting post, the magnetic engaging means including an engaging end oriented to abut a plane perpendicular to the major interior-facing surface;

the head stack assembly also including a tang having a tang surface for abutting the engaging end to provide an inner crash stop and latch; and means for affixing the unitary crash stop member to the base such that a portion of the latch supporting post compresses the vibration damping member against the bearing surface.

2. The head disk assembly of claim 1, wherein the base includes a recess and the vibration damping member includes a solid elastic cylinder having a portion thereof inserted in the recess.

3. The head disk assembly of claim 2, wherein the solid elastic cylinder is made of ethylene propylene diene rubber.

4. The head disk assembly of claim 3, wherein the unitary crash stop member is a dual-post unitary crash member.

5. The head disk assembly of claim 1, wherein the base has an integral side wall that defines the bearing surface.

6. The head disk assembly of claim 5, wherein the vibration damping member has a collar portion surrounding the latch-supporting post.

* * * * *